United States Patent
Hong et al.

(10) Patent No.: US 8,237,881 B2
(45) Date of Patent: Aug. 7, 2012

(54) DISPLAY PANEL, ARRAY SUBSTRATE AND MANUFACTURING METHOD THEREOF

(75) Inventors: Meihua Hong, Beijing (CN); Ziqi Xia, Beijing (CN); Zhinan Zhang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 224 days.

(21) Appl. No.: 12/535,917

(22) Filed: Aug. 5, 2009

(65) Prior Publication Data

US 2010/0033644 A1 Feb. 11, 2010

(30) Foreign Application Priority Data

Aug. 6, 2008 (CN) .......................... 2008 1 0117877

(51) Int. Cl.
*G02F 1/1333* (2006.01)
(52) U.S. Cl. ................ 349/54; 349/43; 349/42; 349/41; 349/38; 349/39
(58) Field of Classification Search .................... 349/41, 349/43, 54, 48, 38, 39
See application file for complete search history.

(56) References Cited

U.S. PATENT DOCUMENTS

| 4,786,780 | A | * | 11/1988 | Oakabe et al. | 219/121.72 |
|---|---|---|---|---|---|
| 5,303,072 | A | * | 4/1994 | Takeda et al. | 349/48 |
| 5,805,248 | A | * | 9/1998 | Sakamoto et al. | 349/48 |
| 7,777,854 | B2 | * | 8/2010 | Moon | 349/149 |
| 7,791,681 | B2 | * | 9/2010 | Kim | 349/55 |
| 2002/0044227 | A1 | * | 4/2002 | Lee | 349/40 |
| 2006/0028603 | A1 | * | 2/2006 | Lee et al. | 349/141 |
| 2007/0216619 | A1 | * | 9/2007 | Hung | 345/87 |
| 2008/0284967 | A1 | * | 11/2008 | Oh et al. | 349/144 |
| 2009/0040407 | A1 | * | 2/2009 | Kim | 349/39 |

FOREIGN PATENT DOCUMENTS

| CN | 1603926 A | 4/2005 |
|---|---|---|
| JP | 10-073842 A | 3/1998 |

* cited by examiner

*Primary Examiner* — Edward Glick
*Assistant Examiner* — Sang Nguyen
(74) *Attorney, Agent, or Firm* — Ladas & Parry LLP

(57) ABSTRACT

An array substrate comprises data lines, gate lines, thin film transistors and pixel electrodes formed on a base substrate. Pixel units are defined by intersecting the data lines and the gate lines, the thin film transistors are formed at the intersections of the data lines and the gate lines, and the data lines extend across each of the pixel units in the middle of the pixel units. At least two thin film transistors for controlling a same pixel electrode are respectively formed on both sides of the data line in each pixel unit.

12 Claims, 3 Drawing Sheets

DISPLAY PANEL, ARRAY SUBSTRATE AND MANUFACTURING METHOD THEREOF

BACKGROUND

Embodiments of the present invention relate to a thin film transistor liquid crystal display.

Thin film transistor liquid crystal displays (TFT-LCDs), which are of small volume, light weight, low power consumption and free of radiation, have prevailed in the market of flat panel display devices. Recently, with the development of large-sized TFT-LCDs, display panels of larger size with high display quality are required, and also the area of each pixel of such kinds of display panel has become bigger. However, since the area of each pixel is increased, a defective pixel may have a greater impact on the display quality, that is, one bright spot or dark spot may exert a remarkable and adverse influence on the display quality. Therefore, in large-sized TFT-LCDs, it is necessary to reduce occurrence of defective pixel and improve the reliability of each pixel.

Generally, a TFT-LCD comprises an array substrate and a color filter substrate facing with each other and holding a liquid crystal layer therebetween. By applying a common voltage to a transparent electrode on the color filter array and a data voltage to a pixel electrode of each pixel on the array substrate, the orientation of the liquid crystal molecules in the liquid crystal layer can be changed by the electric field generated between the array substrate and the color filter substrate. Furthermore, the intensity of the electric field can be modified by the data voltage, and thus the twist angle of the liquid crystal molecules can be controlled and the amount of transmitted light can be correspondingly controlled for displaying image.

FIG. 6 is a schematic view showing a conventional array substrate. As shown in FIG. 6, a plurality of data lines 1 and a plurality of gate lines 2, which are perpendicular to and insulating from each other, are formed on the array substrate, and a plurality of pixel units are defined by intersecting the gate lines 2 with the data lines 1. A thin film transistor (TFT) 4 serving as a switch device is formed at each of the intersections between the gate lines 2 and the data lines 1, and the TFT 4 is connected with a pixel electrode 5 provided in each pixel unit. A storage capacitor 6 is formed by overlapping the pixel electrode 5 with the gate line 2. However, in the conventional array substrate, the capacitance of the storage capacitor is decreased when a displacement is generated between an upper layer and a lower layer, and therefore the stability of the storage capacitor 6 is low, which tends to bring about a bright spot or a dark spot on the final panel, and there is no effective method to repair the defective spot at present. If a bright spot is generated, such bright spot generally can be converted into a dark spot by a laser repairing method, but the display quality still degrades. Furthermore, light leakage causing by a black matrix may occur due to the errors generated at the time of attaching the array substrate to the color filter substrate and the like.

SUMMARY OF THE INVENTION

An array substrate comprising data lines, gate lines, thin film transistors and pixel electrodes formed on a base substrate. Pixel units are defined by intersecting the data lines and the gate lines, the thin film transistors are formed at the intersections of the data lines and the gate lines, and the data lines extend across each of the pixel units in the middle of the pixel units. At least two thin film transistors for controlling a same pixel electrode are respectively formed on both sides of the data line in each pixel unit.

A method of manufacturing an array substrate is further provided in the present invention. The method comprises:

step 1 of forming gate lines, gate electrodes, data lines, source electrodes and drain electrodes on a base substrate, wherein the data lines extend across each of the pixel units, which are defined by intersecting the gate lines and date lines, in the middle of the pixel units, there are formed two source electrodes and two drain electrodes in each pixel unit, and wherein in each pixel unit, one source electrode and one drain electrode are provided on one side of the corresponding data line, and the other source electrode and the other drain electrode are provided on the other side of the corresponding data line;

step 2 of depositing a passivation layer on the base substrate after the step 1 and forming a via hole in the passivation layer on each drain electrode by a patterning process; and step 3 of depositing a transparent conductive layer on the base substrate after the step 2 and forming a pattern comprising pixel electrodes by a patterning process so that the pixel electrode in each pixel unit is connected with the drain electrodes through the via holes in the passivation layer.

A liquid crystal display panel, comprising a color filter substrate, an array substrate and a liquid crystal layer enclosed between the color filter substrate and the array substrate. The color filter substrate comprises a first substrate, a color filer film provided on the first substrate and a transparent electrode provided on the color filter film. The array substrate comprises data lines, gate lines, thin film transistors and pixel electrodes formed on a second substrate, pixel units are defined by intersecting the data lines and the gate lines, the thin film transistors are formed at the intersections of the data lines and the gate lines, the data lines extend across each of the pixel units in the middle of the pixel units, at least two thin film transistors for controlling a same pixel electrode are respectively formed on both sides of the data line in each pixel unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Figure 1:
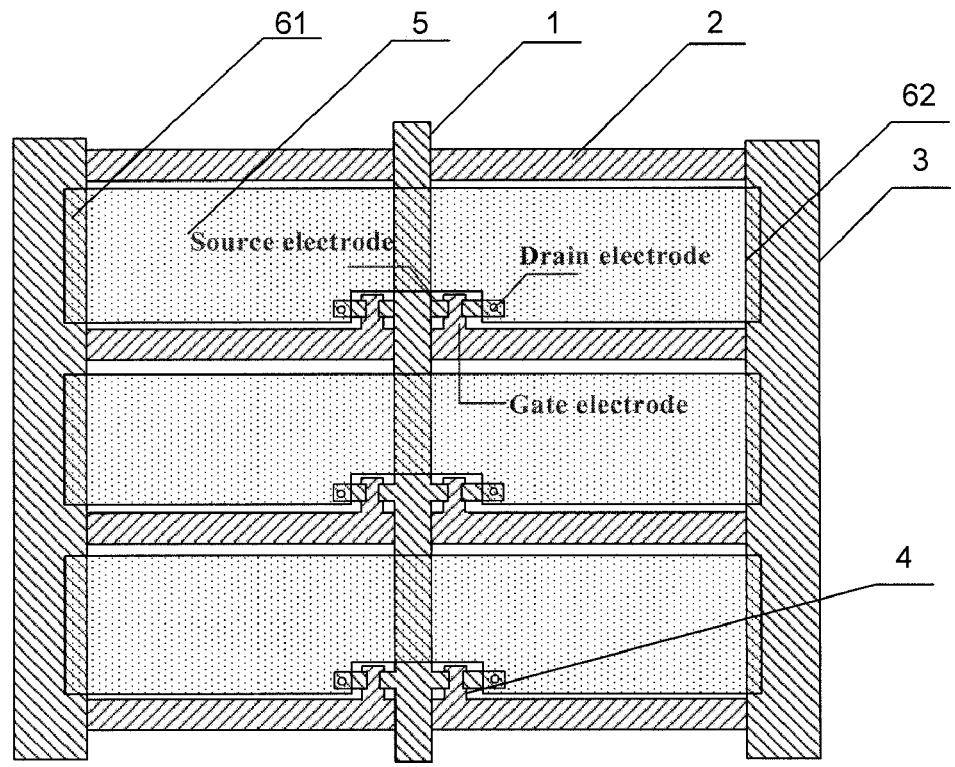
FIG. 1 is a schematic view showing a pixel structure of a TFT-LCD array substrate according to a first embodiment of the invention.

FIG. 1 is a schematic view showing the pixel structure of a TFT-LCD array substrate according to a first embodiment of the invention. As shown in FIG. 1, the TFT-LCD pixel structure in the present embodiment comprises a data line 1, a gate line 2, common electrode lines 3, thin film transistors 4 and a pixel electrode 5. A pixel unit is defined by intersecting of the data line 1 and the gate line 2, and the thin film transistors 4 are formed at the intersection of the data line 1 and the gate line 2. The data line 1 extends across the pixel unit in the middle of the pixel unit, and at least two thin film transistors 4 for controlling the same pixel electrode 5 can be formed on both sides of the data line 1, respectively. The common electrode lines 3 are parallel to the data line 1 and overlap with the pixel electrode 5 to form at least two storage capacitors for one pixel unit. In the present embodiment, in each pixel unit, there exist two thin film transistors 4, and they are provided respectively on both sides of the data line 1. Also, there are formed two storage capacitors, i.e., a first storage capacitor 61 and a second storage capacitor 62, and they are provided on both sides of the pixel unit, respectively. Specifically, the gate line 2 extends at the bottom side of the pixel unit, and the data line 1 extends across the pixel unit in the middle of the pixel unit and intersects with the gate line 2. A pair of source and drain electrodes is formed by the portion branching from the data line 1. One pair of the electrodes is provided on each side of the data line 1, and there are two thin film transistors 4. The pixel electrode 5 is formed in each pixel unit and thus a matrix of the pixel electrode 5 is formed on the array substrate. The pixel electrode 5 in each pixel unit is connected with the two thin film transistors 4 so that it can be controlled by these thin film transistors, and accordingly even when one thin film transistor 4 is defective, the pixel electrode can still be switched on by the other thin film transistor 4. Therefore the failure of the pixel electrode 5 resulting from one defective thin film transistor 4 can be prevented. It should be noted that at least two thin film transistors 4 can be provided in each pixel unit as necessary, so that the remaining thin film transistor that has no defect can function properly as a switching device if defects occur to certain thin film transistor. In addition, the common electrode lines 3 are provided at the edges of the pixel electrode 5 on both sides of the data line 1, and thus the first storage capacitor 61 is formed by overlapping the pixel electrode 5 with the common electrode line 3 on one side of the data line 1, and the second storage capacitor 62 is formed by overlapping the pixel electrode 5 with the common electrode line 3 on the other side of the data line 1. Therefore, a more stable voltage can be applied to the thin film transistor 4 through the first storage capacitor 61 and the second storage capacitor 62, and thus the reliability of the pixel unit can be improved.

In the present embodiment, two thin film transistors are provided in each pixel unit and these two thin film transistors are connected with a same pixel electrode. Thus both of the thin film transistors can charge the pixel electrode and the charge speed can be greatly increased and a complete charge can be ensured, and therefore the TFT-LCD pixel structure in the present embodiment has the advantage of a higher response speed. Furthermore, if defect occurs to one thin film transistor, the operation of the pixel electrode can still be maintained by the other thin film transistor, and thus the TFT-LCD pixel structure in the present embodiment further has the advantage of a higher reliability. In addition, two storage capacitors are provided in each pixel unit, and thus failures causing by the displacement between an upper layer and a lower layer can be avoided, and the production yield of manufacturing the TFT-LCD is increased. In the embodiment, there can be formed no common electrode line 3 or one common electrode line 3 only for one pixel unit.

Figure 2:
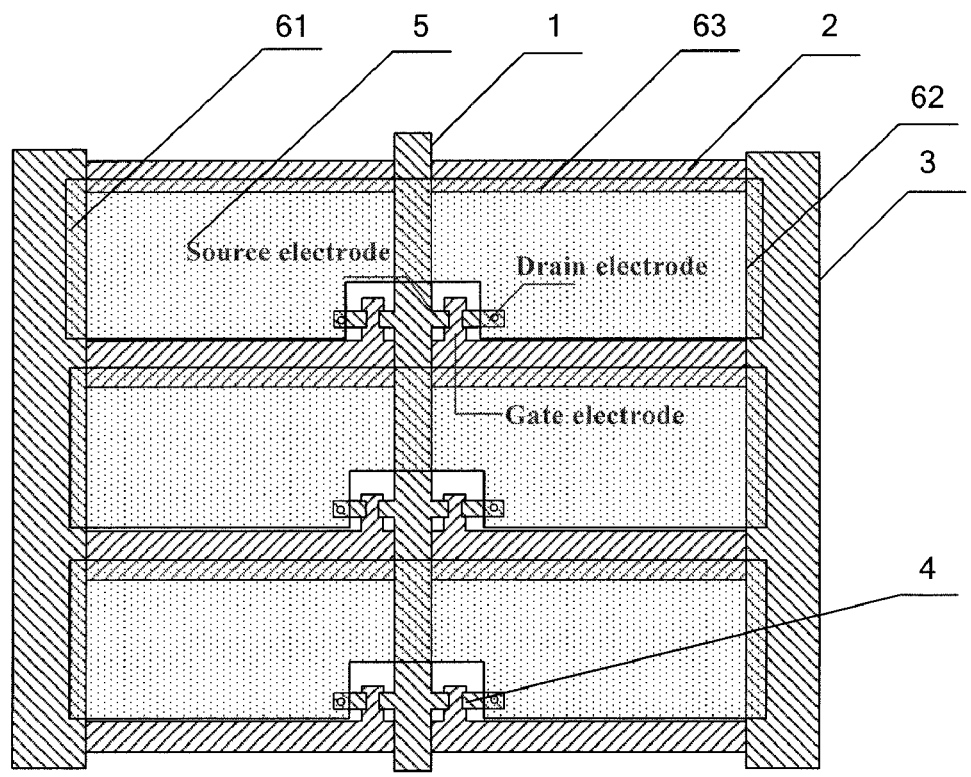
FIG. 2 is a schematic view showing a pixel structure of a TFT-LCD array substrate according to a second embodiment of the invention.
Figure 3:
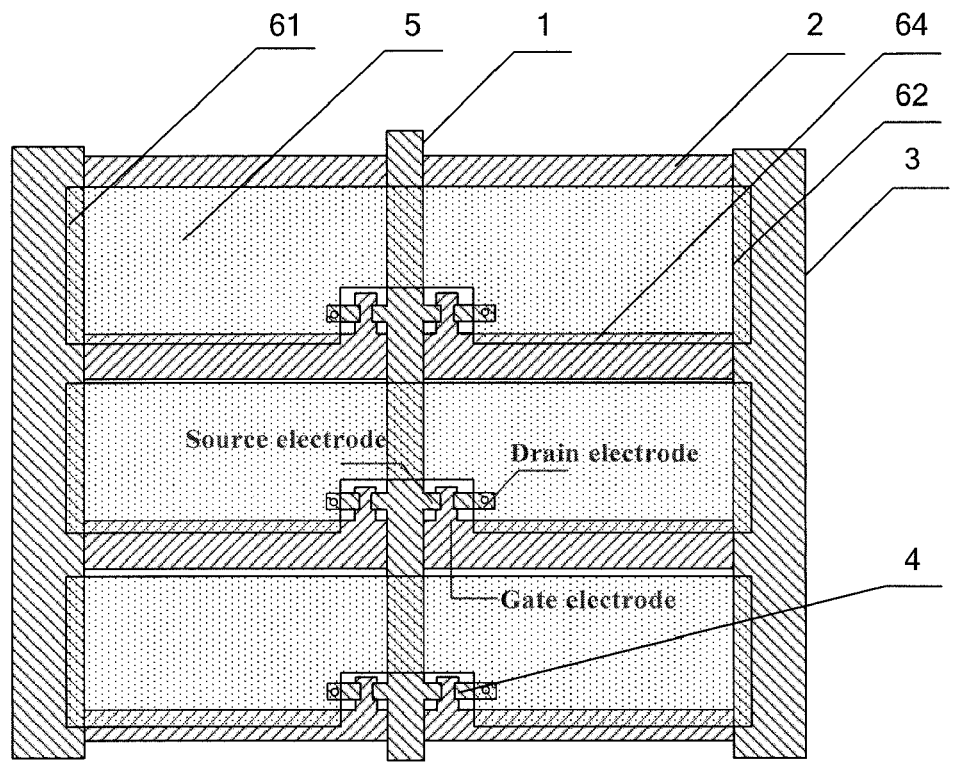
FIG. 3 is a schematic view showing another pixel structure of a TFT-LCD array substrate according to the second embodiment of the invention.
Figure 4:
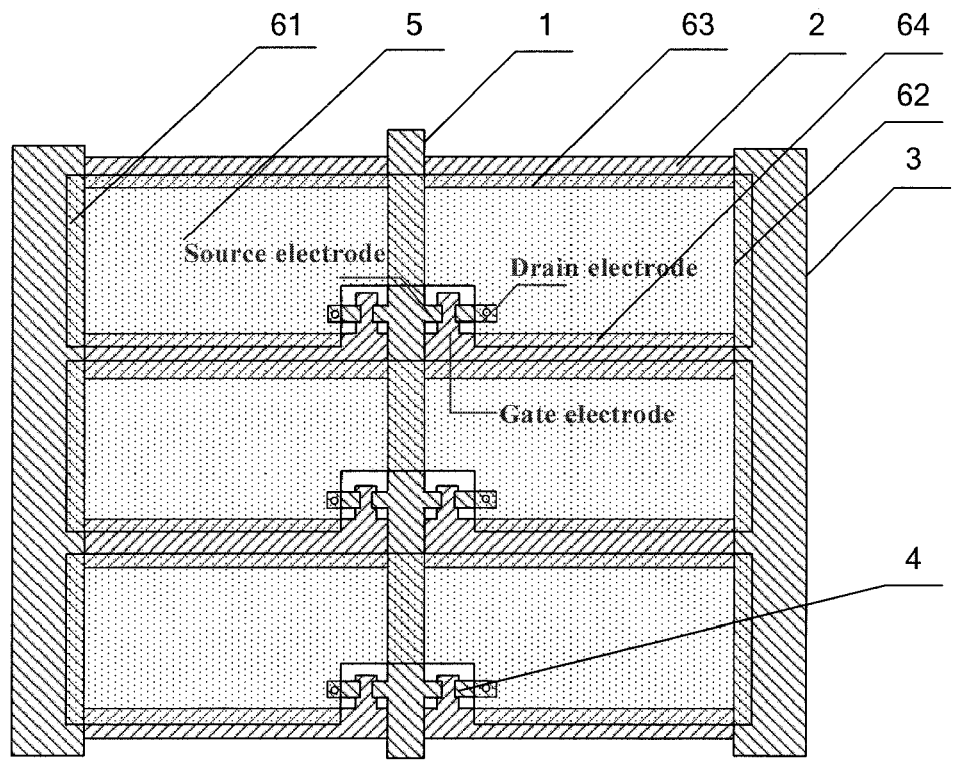
FIG. 4 is a schematic view showing further another pixel structure of a TFT-LCD array substrate according to the second embodiment of the invention.

FIG. 2 is a schematic view showing the pixel structure of a TFT-LCD array substrate according to a second embodiment of the invention, FIG. 3 is a schematic view showing another pixel structure of a TFT-LCD array substrate according to the second embodiment of the invention, and FIG. 4 is a schematic view showing further another pixel structure of a TFT-LCD array substrate according to the second embodiment of the invention.

As shown in FIG. 2 to FIG. 4, the TFT-LCD pixel structure in the present embodiment comprises a data line 1, a gate line 2, common electrode lines 3, thin film transistors 4 and a pixel electrode 5. A pixel unit is defined by intersecting of the data line 1 with the gate line 2, and the thin film transistors 4 are formed at the intersection of the data line 1 and the gate line 2. The data line 1 extends across each pixel unit in the middle of the pixel unit. At least two thin film transistors 4 for controlling a same pixel electrode 5 are formed on both sides of the data line 1, respectively. The common electrode lines 3 are parallel to the data line 1 and overlap with the pixel electrode 5 to form at least two storage capacitors. In the present embodiment, there exist two thin film transistors 4 in each pixel unit, and they are provided on both sides of the data line 1, respectively. Specifically, the gate line 2 is extended at the bottom side of each pixel unit on the substrate, and the data line 1 extends across the pixel unit in the middle of the pixel unit and intersects with the gate line 2. A pair of source and drain electrodes is formed by the portion branching from the data line 1, and two electrode pairs thus formed are respectively provided on both sides of the data line 1 to form two thin film transistors 4. The pixel electrode 5 is formed in each pixel unit and thus a matrix of the pixel electrode 5 is formed on the array substrate. The pixel electrode 5 in each pixel unit is connected with two thin film transistors 4 so that it can be controlled by these two thin film transistors, and thus even when defect occurs to one thin film transistor 4, the pixel electrode can still be switched on by the other thin film transistor 4. Therefore, the failure of the pixel electrode 5 resulting from the defective thin film transistor 4 can be prevented. It should be noted that at least two thin film transistors 4 can be provided in each pixel unit as necessary so that the remaining thin film transistor with no defects can function properly as a switching device if defect occur to certain thin film transistor. In addition, the common electrode lines 3 are provided at the edges of the pixel electrode 5 on both sides of the data line 1, and thus a first storage capacitor 61 is formed by overlapping the pixel electrode 5 with the common electrode line 3 on one side of the data line 1, and a second storage capacitor 62 is formed by overlapping the pixel electrode 5 with the common electrode line 3 on the other side of the data line 1. Furthermore, as shown in FIG. 2, a third storage capacitor 63 is formed by overlapping the pixel electrode 5 with the gate line 2 on the upper side of the pixel electrode 5.

Alternatively, as shown in FIG. 3, a fourth storage capacitor 64 is formed by overlapping the pixel electrode 5 with the gate line 2 on the lower side of the pixel electrode 5. Alternatively, as shown in FIG. 4, a third storage capacitor 63 is formed by overlapping the pixel electrode 5 with the gate line 2 on the upper side of the pixel electrode 5, and a fourth storage capacitor 64 is simultaneously formed by overlapping the pixel electrode 5 with the gate line 2 on the lower side of the pixel electrode 5. Therefore, a more stable voltage can be applied to the thin film transistors 4 through the first storage capacitor 61, the second storage capacitor 62, the third storage capacitor 63 and/or the fourth storage capacitor 64, and thus the reliability of the pixel can be improved.

The primary structure of the second embodiment is similar to that of the first embodiment except that three or four storage capacitors are formed in each pixel unit. Therefore, in addition to the effects and advantages that can be obtained in the first embodiment, a more stable voltage can be applied to the thin film transistors and the production yield of manufacturing the TFT-LCD can be further increased.

A method of manufacturing a TFT-LCD array substrate according to an embodiment of the present invention comprises:

Step 1 of forming gate lines, gate electrodes, data lines, source electrodes, drain electrodes, and common electrode lines on a base substrate, wherein the data lines extend across each of the pixel units, which are defined by intersecting the gate lines and date lines, in the middle of the pixel units, there are formed two source electrodes, two drain electrodes and two common electrode lines in each pixel unit, one source electrode, one drain electrode and one common electrode line is provided on one side of the data line, and the other source electrode, the other drain electrode and the other common electrode line are provided on the other side of the data line;

Step 2 of depositing a passivation layer on the base substrate after the step 1 and forming a via hole in the passivation layer on each drain electrode by a patterning process; and Step 3 of depositing a transparent conductive layer on the base substrate after the step 2 and forming a pattern comprising pixel electrodes by a patterning process so that the pixel electrode in each pixel unit is connected with the drain electrodes through the via holes in the passivation layer and a storage capacitor is formed by overlapping the pixel electrode in each pixel unit with one of the common electrode lines.

Specifically, in the step 3, there are formed two storage capacitors for each pixel unit. The common electrode lines are provided at the edges of the pixel electrode on both sides of the data line, so that a first storage capacitor is formed by overlapping the pixel electrode with the common electrode line on one side of the data line and a second storage capacitor is formed by overlapping the pixel electrode with the common electrode line on the other side of the data line.

In addition, in the case a third storage capacitor is formed by the pixel electrode and the gate line on the upper side of the pixel electrode, the step 3 may further comprise: forming the third storage capacitor by overlapping the pixel electrode with the gate line on the upper side of the pixel electrode.

Similarly, in the case in which a fourth storage capacitor is formed by the pixel electrode and the gate line on the lower side of the pixel electrode, the step 3 may further comprise: forming the fourth storage capacitor by overlapping the pixel electrode with the gate line on the lower side of the pixel electrode.

The embodiments of the present invention will be described in detail hereinafter. Please not that there may be no common line or one common line only for each pixel unit. In the following descriptions, a patterning process may comprise the processes of coating a photoresist layer, employing a mask to expose the photoresist, developing of the exposed photoresist layer to form a photoresist pattern, etching the underlying layer through the photoresist pattern, removing the photoresist pattern, and the like, as known in the art.

The method of manufacturing a TFT-LCD array substrate according to an example of the present invention can be conducted by a five-mask processes comprising:

Step 11 of depositing a gate metal layer on a substrate and forming gate lines and gate electrodes on the base substrate by patterning the gate metal layer with a patterning process;

Step 12 of depositing a gate insulating layer, a semiconductor layer and a doped semiconductor layer in this order on the base substrate after the step 11 and forming an active layer on the gate electrodes by patterning the semiconductor layer and the doped semiconductor layer with a patterning process;

Step 13 of depositing a metal layer for source and drain electrodes on the substrate after step 12 and forming data lines, source electrodes, drain electrodes, TFT channel regions and common electrode lines by patterning the metal layer for source and drain electrodes with a patterning process, wherein the data lines extend across each of the pixel units, which are defined by intersecting the gate lines and date lines, in the middle of the pixel units, and there exist two source electrodes, two drain electrodes, two TFT channel regions and two common electrode lines in each pixel unit, and wherein, in each pixel unit, one source electrode, one drain electrode, one TFT channel region and one common electrode line are provided on one side of the corresponding data line, and the other source electrode, the other drain electrode, the other TFT channel region and the other common electrode line are provided on the other side of the corresponding data line;

Step 14 of depositing a passivation layer on the base substrate after the step 13 and forming a via hole in the passivation layer on each drain electrode by a patterning process; and Step 15 of depositing a transparent conductive layer on the base substrate after the step 14 and forming a pattern comprising pixel electrodes by a patterning process so that pixel electrodes are connected with the drain electrodes through the via holes in the passivation layer and storage capacitors are formed by overlapping the pixel electrodes with the common electrode lines.

Specifically, in the step 15, there are formed two storage capacitors for each pixel unit. In each pixel unit, the common electrode lines are provided at the edges of the pixel electrode on both sides of the data line, so that a first storage capacitor is formed by overlapping the pixel electrode with the common electrode line on one side of the corresponding data line, and a second storage capacitor is formed by overlapping the pixel electrode with the common electrode line on the other side of the corresponding data line.

In addition, in the case in which a third storage capacitor is formed by the pixel electrode and the gate line on the upper side of the pixel electrode, the step 15 may further comprise: forming the third storage capacitor by overlapping the pixel electrode with the gate line on the upper side of the pixel electrode.

Similarly, in the case in which a fourth storage capacitor is formed by the pixel electrode and the gate line on the lower side of the pixel electrode, the step 15 may further comprise: forming the fourth storage capacitor by overlapping the pixel electrode with the gate line on the lower side of the pixel electrode.

Furthermore, the method of manufacturing a TFT-LCD array substrate according to another example of the present invention can be accomplished by a four-mask process comprising:

Step 21 of depositing a gate metal layer on a substrate and forming gate lines and gate electrodes on the base substrate by patterning the gate metal layer with a patterning process;

Step 22 of depositing a gate insulating layer, a semiconductor layer, a doped semiconductor layer and a metal layer for source and drain electrodes in this order on the base substrate after the step 21 and forming data lines, source electrodes, drain electrodes, TFT channel regions and common electrode lines by a patterning process with a half-tone mask or a gray-tone mask, wherein the data lines extend across each of the pixel units, which are defined by intersecting the gate lines and date lines, in the middle of the pixel units, and there exist two source electrodes, two drain electrodes, two TFT channel regions and two common electrode lines in each pixel unit, and wherein, in each pixel unit, one source electrode, one drain electrode, one TFT channel region and one common electrode line are provided on one side of the corresponding data line, and the other source electrode, the other drain electrode, the other TFT channel region and the other common electrode line is provided on the other side of the corresponding data line;

Step 23 of depositing a passivation layer on the base substrate after the step 22 and forming a via hole in the passivation layer on each drain electrode by a patterning process; and Step 24 of depositing a transparent conductive layer on the base substrate after the step 23 and forming a pattern comprising pixel electrodes by a patterning process so that the pixel electrodes are connected with the drain electrodes through the via holes in the passivation layer and storage capacitors are formed by overlapping the pixel electrodes with the common electrode lines.

Specifically, in the step 24 may comprise, there are formed two storage capacitors for each pixel unit. The common electrode lines are provided at the edges of the pixel electrode on both sides of the data line, so that a first storage capacitor is formed by overlapping the pixel electrode with the common electrode line on one side of the data line, and a second storage capacitor is formed by overlapping the pixel electrode with the common electrode line on the other side of the data line.

In addition, in the case in which a third storage capacitor is formed by the pixel electrode and the gate line on the upper side of the pixel electrode, the step 24 may further comprise: forming the third storage capacitor by overlapping the pixel electrode with the gate line on the upper side of the pixel electrode.

Similarly, in the case in which a fourth storage capacitor is formed by the pixel electrode and the gate line on the lower side of the pixel electrode, the step 24 may further comprise: forming the fourth storage capacitor by overlapping the pixel electrode with the gate line on the lower side of the pixel electrode.

The TFT-LCD pixel structure obtained through the method of manufacturing a TFT-LCD array substrate according to the embodiment of the present invention comprises a date line, a gate line, a common electrode line, thin film transistors and a pixel electrode in a pixel unit, wherein the data line and the gate line are perpendicular to each other, the thin film transistors are formed at the intersection of the data line and the gate line, the data line extends across the pixel unit in the middle of the pixel unit, at least two thin film transistors for controlling a same pixel electrode are respectively formed on both sides of the data line, and the common electrode line is parallel to the data line and overlaps with the pixel electrode to form at least two storage capacitors. The thin film transistor that comprises the gate electrode and the source and drain electrodes formed on the substrate can be formed in a various ways known in the art. For example, the gate electrode is connected with the gate line, the source electrode is connected with the data line, and the drain electrode is connected with the pixel electrode. There may be no common electrode line or only common electrode line for one pixel unit.

With the method of manufacturing the TFT-LCD array substrate according to the embodiment of the present invention, data lines, common electrode lines, source electrodes, drain electrodes and TFT channel regions are formed by patterning a metal layer for source and drain electrodes with a patterning process. The data lines extend across each of the pixel units in the middle of the pixel units. Two pairs of the source and drain electrodes are provided in each pixel unit to form two thin film transistors in each pixel unit, and one pair is formed on one side of the date line. Therefore, the charge speed can be greatly increased and a complete charge can be ensured, and thus the TFT-LCD pixel structure in the present invention has the advantage of a higher response speed. Furthermore, if defect occurs to one thin film transistor in one pixel, the operation of the pixel electrode can still be maintained by the other thin film transistor in the pixel, and thus the TFT-LCD pixel structure in the present invention further has the advantage of a higher reliability.

Figures 5, 6:
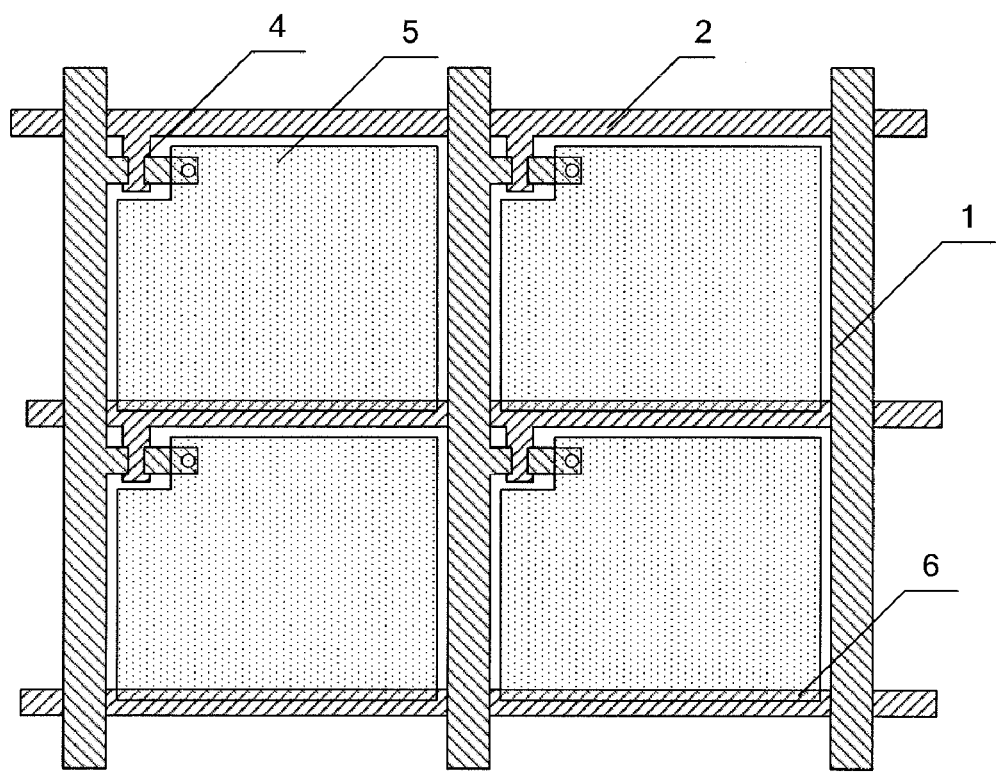
FIG. 5 is a schematic view showing pixel structure of a color filter substrate according to the invention.
FIG. 6 is a schematic view showing a conventional pixel structure of a TFT-LCD array substrate.

A liquid crystal display panel comprising the above-described TFT-LCD array substrate is further provided according to an embodiment of the present invention. The liquid crystal display panel comprises a color filter substrate, a liquid crystal layer and an array substrate. The color filter substrate comprises a base substrate, a color filer film provided on the substrate and a transparent electrode provided on the color filter film. FIG. 5 is a schematic view showing pixel structure of a color filter substrate according to the embodiment. As shown in FIG. 5, each pixel comprises three subpixels of red, green and blue colors. Since the gate lines and the common electrode lines of the above-described TFT-LCD array substrate are formed by metal materials, a black matrix is no longer needed in the corresponding portion of the color filter substrate. Therefore, the cost of manufacturing the color filter substrate can be reduced due to the elimination of the black matrix, and the light leakage resulting from the displacement of the black matrix is also prevented.

Another liquid crystal display comprising the above-described TFT-LCD array substrate is further provided in an embodiment of the present invention. The liquid crystal display panel comprises a color filter substrate and an array substrate with a liquid crystal layer therebetween. The color filter substrate comprises a base substrate, a color filer film provided on the base substrate and a transparent electrode provided on the color filter film. A black matrix is provided on the portion of the color filter film corresponding to the gate lines on the array substrate. Since the common electrode lines of the above-described TFT-LCD array substrate are formed by a metal material, the black matrix is no longer needed in the corresponding portion of the color filter substrate. Thus, only a lateral black matrix is for example provided without a longitudinal black matrix, and therefore the light leakage resulting from the displacement of the longitudinal black matrix can be prevented.

In addition, the above-described embodiments can also be realized by other processes. As for the structure of the array substrate with the common electrode thereon, various modifications and variations can be conducted and theses modifications and variations are within the spirit and scope of the present invention.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. An array substrate comprising data lines, gate lines, common electrode lines, thin film transistors and pixel electrodes formed on a base substrate,
   wherein pixel units are defined by intersecting the data lines and the gate lines, the thin film transistors (TFTs) are formed at the intersections of the data lines and the gate lines, and the data lines extend across the respective pixel units in the middle of the pixel units;
   wherein the common electrode lines are parallel to the data lines and provided between and separating adjacent pixel units in an extension direction of the gate lines, and
   wherein each pixel unit comprises a pixel electrode and at leas two TFTs, and the data line corresponding to the pixel unit overlaps with the middle portion of the pixel electrode of the pixel unit, gate electrodes of the at least two TFTs are connected with the gate line corresponding to the pixel unit, drain electrodes of the at least two TFTs are connected with the pixel electrode of the pixel unit, and source electrodes of the at least two TFTs are connected with the data line corresponding to the pixel unit, and the at least two TFTs are respectively formed on both sides of the data line corresponding to the pixel unit.

2. The array substrate according to claim 1, wherein a storage capacitor is formed by overlapping one of the common electrode lines with the pixel electrode in each pixel unit.

3. The array substrate according to claim 2, wherein, in each pixel unit, two storage capacitors are formed, and
   wherein two common electrode lines are provided at the edges of the pixel electrode on both sides of the corresponding data line, and thus a first storage capacitor is formed by overlapping the pixel electrode with the common electrode line on one side of the corresponding data line, and a second storage capacitor is formed by overlapping the pixel electrode with the common electrode line on the other side of the corresponding data line.

4. The array substrate according to claim 2, wherein a third storage capacitor is further formed in each pixel unit by overlapping the pixel electrode with the gate line on the upper side of the pixel electrode of the pixel unit.

5. The array substrate according to claim 2, wherein a fourth storage capacitor is further formed in each pixel unit by overlapping the pixel electrode with the gate line on the lower side of the pixel electrode of the pixel unit.

6. The array substrate according to claim 1, wherein a storage capacitor is formed by overlapping one of the common electrode lines with the pixel electrode in each pixel unit.

7. A liquid crystal display panel, comprising a color filter substrate, an array substrate and a liquid crystal layer enclosed between the color filter substrate and the array substrate,
   wherein the color filter substrate comprises a first substrate, a color filer film provided on the first substrate and a transparent electrode provided on the color filter film; and
   wherein the array substrate comprises data lines, gate lines, common electrode lines, thin film transistors and pixel electrodes formed on a second substrate, pixel units are defined by intersecting the data lines and the gate lines, the thin film transistors (TFTs) are formed at the intersections of the data lines and the gate lines, the data lines extend across the respective pixel units in the middle of the pixel units,
   the common electrode lines are parallel to the data lines and provided between and separating adjacent pixel units in an extension direction of the gate lines,
   each pixel unit comprises a pixel electrode and at leas two TFTs, and the data line corresponding to the pixel unit overlaps with the middle portion of the pixel electrode of the pixel unit, gate electrodes of the at least two TFTs are connected with the gate line corresponding to the pixel unit, drain electrodes of the at least two TFTs are connected with the pixel electrode of the pixel unit, and source electrodes of the at least TFTs are connected with the data line corresponding to the pixel unit, and the at least two TFTs are respectively formed on both sides of the data line in the pixel unit.

8. The liquid crystal display panel according to claim 7, wherein a black matrix is provided on the portion of the color filter film corresponding to the gate lines of the array substrate.

9. The liquid crystal display panel according to claim 7, wherein a storage capacitor is formed by overlapping one of the common electrode lines with the pixel electrode in each pixel unit.

10. The array substrate according to claim 2, wherein the common electrode lines are formed of a metal material for blocking light.

11. The liquid crystal display panel according to claim 7, wherein the common electrode lines are formed of a metal material for blocking light.

12. The liquid crystal display panel according to claim 11, wherein the gate lines are formed of a metal material for blocking light, and there is no black matrix formed on the color filter substrate.

* * * * *